United States Patent
Reponen et al.

(10) Patent No.: US 8,832,575 B2
(45) Date of Patent: Sep. 9, 2014

(54) SPEED DEPENDENT DISPLAYING OF INFORMATION ITEMS IN A GRAPHICAL USER INTERFACE

(75) Inventors: Erika Reponen, Tampere (FI); Timo Elomaa, Pirkkala (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 537 days.

(21) Appl. No.: 11/535,104

(22) Filed: Sep. 26, 2006

(65) Prior Publication Data

US 2008/0288880 A1  Nov. 20, 2008

(51) Int. Cl.
*G06F 3/048*  (2013.01)
*G06F 3/0481*  (2013.01)
*G06F 3/0482*  (2013.01)
*H04M 1/725*  (2006.01)

(52) U.S. Cl.
CPC ....... *G06F 3/04812* (2013.01); *H04M 1/72583* (2013.01); *G06F 3/0482* (2013.01)
USPC ............................ 715/769; 715/788; 715/799

(58) Field of Classification Search
CPC ........................................................ G06F 3/048
USPC .................................. 715/834, 769, 788, 799
See application file for complete search history.

(56) References Cited

U.S. PATENT DOCUMENTS

| | | | | |
|---|---|---|---|---|
| 5,532,753 A * | 7/1996 | Buchner et al. | ................. | 725/56 |
| 5,592,195 A * | 1/1997 | Misono et al. | ................ | 715/860 |
| 5,675,752 A * | 10/1997 | Scott et al. | ..................... | 715/866 |
| 6,243,076 B1 * | 6/2001 | Hatfield | ........................ | 345/156 |
| 6,295,062 B1 * | 9/2001 | Tada et al. | ..................... | 715/835 |
| 7,051,291 B2 * | 5/2006 | Sciammarella et al. | ...... | 715/838 |
| 7,426,467 B2 * | 9/2008 | Nashida et al. | ............... | 704/275 |
| 2003/0234953 A1 * | 12/2003 | Dawson et al. | .............. | 358/1.15 |
| 2004/0150657 A1 * | 8/2004 | Wittenburg et al. | ........... | 345/619 |
| 2005/0081164 A1 * | 4/2005 | Hama et al. | ................... | 715/830 |
| 2006/0059426 A1 * | 3/2006 | Ogikubo | ....................... | 715/723 |
| 2007/0061748 A1 * | 3/2007 | Hirose | .......................... | 715/764 |
| 2007/0124677 A1 * | 5/2007 | de los Reyes et al. | ........ | 715/705 |
| 2007/0157095 A1 * | 7/2007 | Bilow et al. | ................... | 715/744 |
| 2007/0220444 A1 * | 9/2007 | Sunday et al. | ................ | 715/788 |

* cited by examiner

*Primary Examiner* — Doon Chow
*Assistant Examiner* — Le Nguyen
(74) *Attorney, Agent, or Firm* — Ziegler IP Law Group

(57) ABSTRACT

Electronic device with a display screen and a navigational input device places information items in a string along a path on the display screen. The user can move the string of information items along the path at a variable speed by using the navigational input means. The shape of the path is changed in relation to the speed at which the string of information items is moved along the path. At low speeds the path is substantially rectangular and follows the outline of the rectangular display screen. At higher speeds the path becomes more and more curved.

24 Claims, 4 Drawing Sheets

SPEED DEPENDENT DISPLAYING OF INFORMATION ITEMS IN A GRAPHICAL USER INTERFACE

FIELD

The disclosed embodiments relate to user interfaces of apparatus, in particular to user interfaces of apparatus that include a display screen on which a plurality of information items can be moved along a path under user control through the use of a navigational input device.

BACKGROUND

Increased processing power has made it easier to manipulate information items on a display of a mobile electronic device, for example through presence of improved graphics accelerators. Several attempts have been made to put this increase processing power to use in improving the user-friendliness of graphical UIs. For example, it is now possible to show three dimensional objects on mobile electronic devices and to show two-dimensional objects in a three-dimensional UI space. However, these attempts have mainly cluttered the user interface for the normal user when effects steal the attention from the tasks to be performed. This is a new situation in mobile electronic devices. Solutions for more intuitive UI graphics are needed. Thus, there is a desire for more flexible and intuitive ways of UI navigation visualizations.

On the above background, it would be advantageous to at least partially fulfill one or more of the above indicated desires.

It would also be advantageous to provide a more intuitive way of visualizing information items that are displayed on a display screen an electronic device.

SUMMARY

In one embodiment string of information items is displayed on a display screen along a path, allowing the user to control the speed of movement of the information items along the path through a navigational input means and changing the shape of the path in relation to the speed of movement of the string of items along the path.

The changing shape of the path provides the user with an optical feedback and thereby improves the feeling of control over the speed of movement of the items in the string. Thus, user confidence is improved and the acceptance of the technology is increased.

Further features, advantages and properties of the apparatus, the user interface, the method and the software product, according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the electronic device and the method according to the invention in the form of a personal computer, PDA, mobile terminal or a mobile communication terminal in the form of a cellular/mobile phone will be described by the preferred embodiments.

Figure 1:
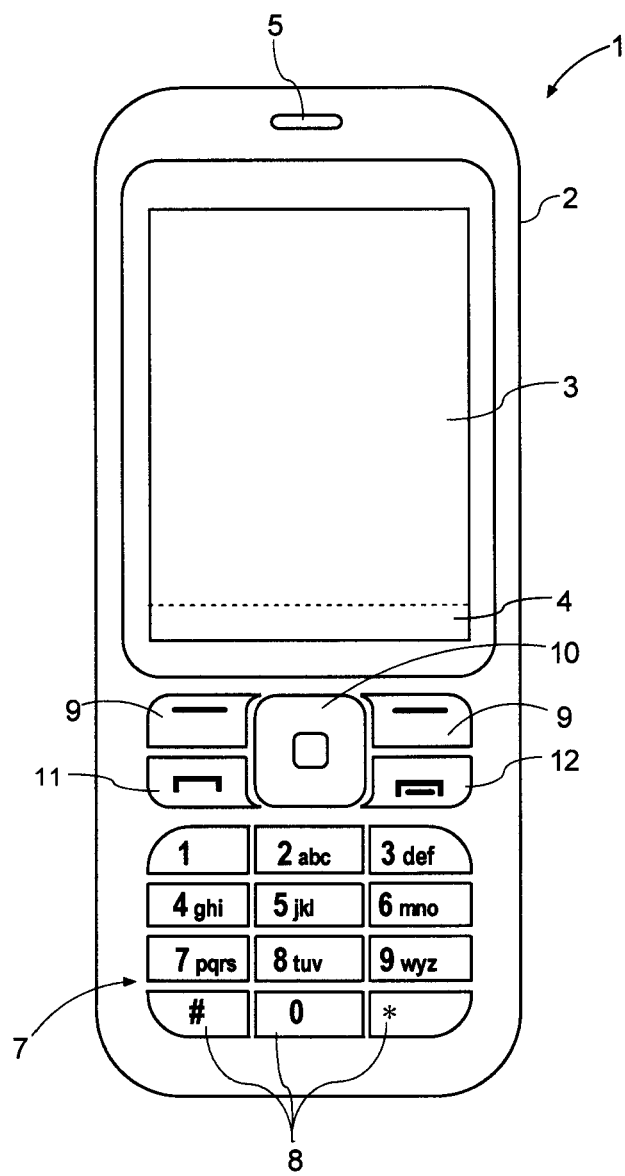
FIG. 1 is a front view of a mobile electronic device according to an embodiment of the invention.

FIG. 1 illustrates a first embodiment of a mobile terminal according to the invention in the form of a mobile telephone by a front view. The mobile phone 1 comprises a user interface having a housing 2, a display 3, an on/off button (not shown), a speaker 5 (only the opening is shown), and a microphone 6 (not visible in FIG. 1). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 2 has additionally a second group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation-key 10. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call. This key layout is characteristic for e.g. the Nokia 6230i™ phone.

The navigation key 10 is a four- or five-way key which can be used for cursor movement, scrolling and selecting (five-way key) and is placed centrally on the front surface of the phone between the display 3 and the group of alphanumeric keys 7.

A releasable rear cover (not shown) gives access to the SIM card (not shown), and the battery pack (not shown) in the back of the phone that supplies electrical power for the electronic components of the mobile phone 1.

The mobile phone 1 has a flat display 3 that is typically made of an LCD with optional back lighting, such as a TFT matrix capable of displaying color images. A touch screen may be used instead of a conventional LCD display.

Figure 2:
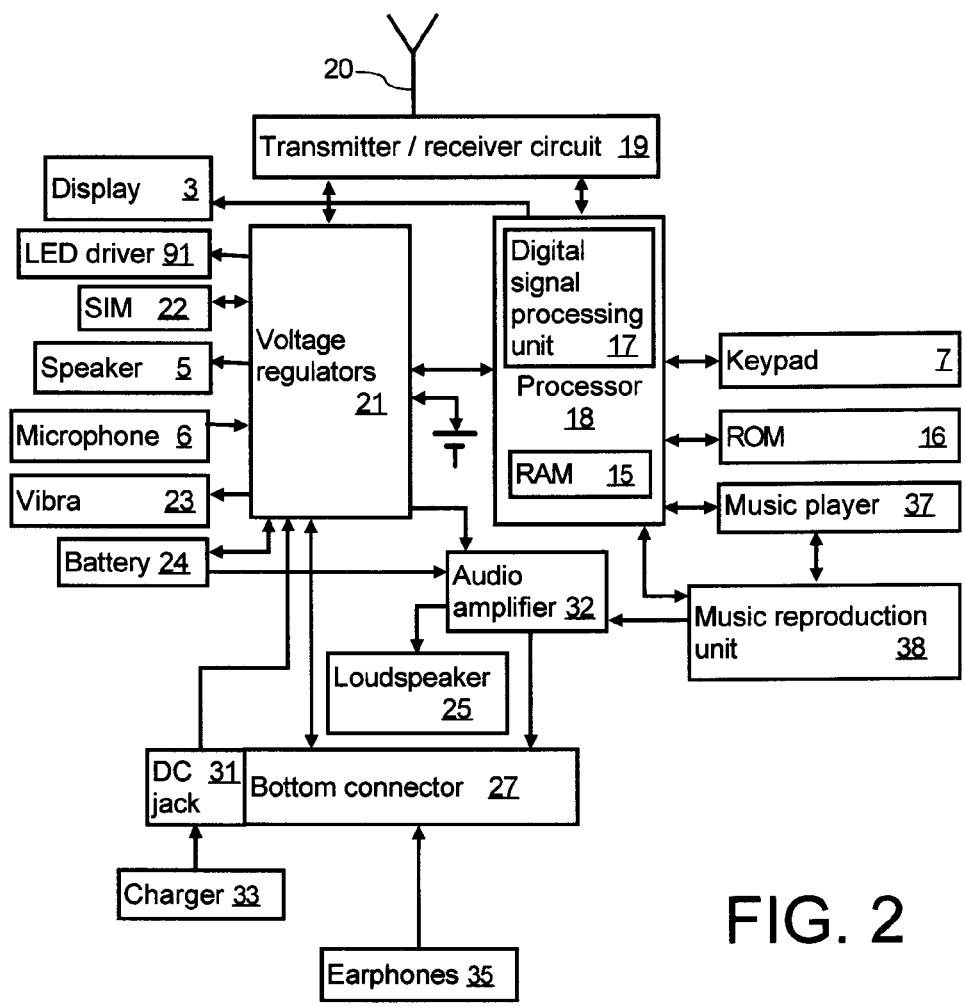
FIG. 2 is a block diagram illustrating the general architecture of a mobile electronic of FIG. 1.

FIG. 2 illustrates in block diagram form the general architecture of the mobile phone 1 constructed in accordance with the present invention. The processor 18 controls the operation of the terminal and has an integrated digital signal processor 17 and an integrated RAM 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the DSP 17 that is included in the processor 18. The encoded speech signal is transferred to the processor 18, which e.g. supports the GSM terminal software. The digital signal-processing unit 17 speech-decodes the signal, which is transferred from the processor 18 to the speaker 5 via a D/A converter (not shown).

The voltage regulators 21 form the interface for the speaker 5, the microphone 6, the LED drivers 91 (for the LEDS backlighting the keypad 7 and the display 3), the SIM card 22, battery 24, the bottom connector 27, the DC jack 31 (for connecting to the charger 33) and the audio amplifier 32 that drives the (hands-free) loudspeaker 25.

The processor 18 also forms the interface for some of the peripheral units of the device, including a (Flash) ROM memory 16, the graphical display 3, the keypad 7, the ringing tone selection unit 26, an incoming call detection unit 28, a music data recording medium 36, a music player 37 and a music reproduction unit 38.

The processor 18 may include a graphics accelerator, such as a 3D graphics accelerator, or the graphics accelerator may be a separate processor (not shown).

The software in the RAM 15 and/or in the flash ROM 16 contains instructions for the processor 18 to perform a plurality of different applications and functions.

Figure 3:
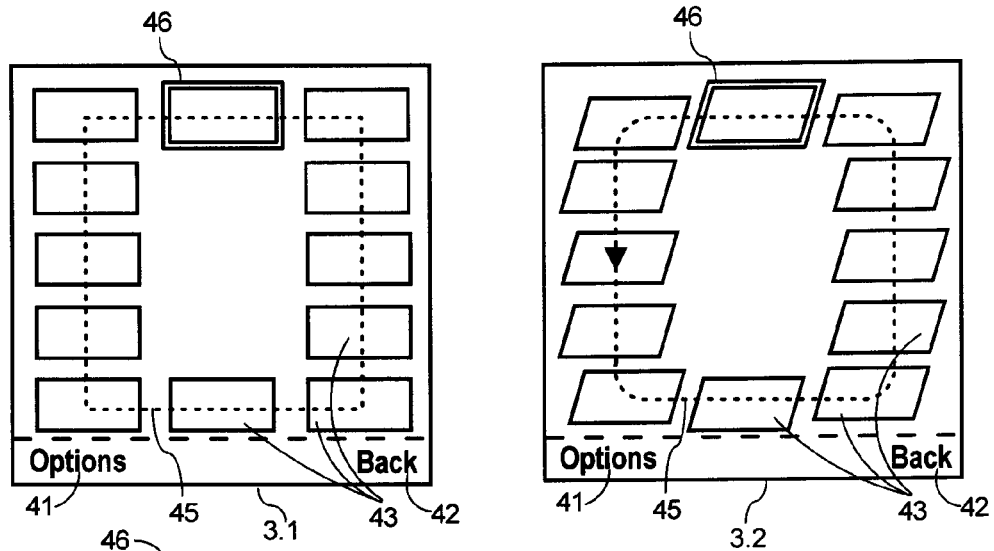
FIG. 3 shows three screenshots illustrating an embodiment of a method of operating the user interface according to the present invention.
Figure 3:
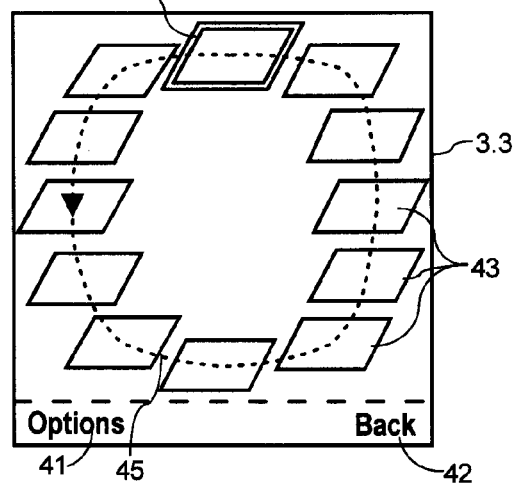

FIG. 3 illustrates an embodiment of the invention by three screenshots of a gallery application in which thumbnails of pictures stored in the memory of the mobile phone 1 are displayed as a string of information items 43 on the display screen 3. The left softkey label 41 and the right softkey label 42 are displayed on the lower part of the display screen 3, and allow the user to access options related menu via the left softkey 9 and to leave the gallery application via the right softkey 9.

In screenshot 3.1 the string of information items 43 is not moving and the information items are arranged in the string in accordance with a substantially rectangular path 45. When the user presses the navigation key 10 on the left or on the right side the processor 18 will start to move the stream of information items along the path 45. One of the information items 43 is highlighted by a box 46, and the highlighted information item can be selected by centrally pressing the navigation key 10. When the information item is a picture, the picture associated with the thumbnail will be shown on the display screen 3 when the information item is selected.

According to other embodiments, the information items can be other items than picture thumbnails. The following is a non-exhaustive list of types of information items that can be used in connection with the disclosed embodiments: thumbnails of videos thumbnails (video stills), pictures of audio, such as album art, mp3-tagging (rock, pop, funk, house, classical, continue yourself), phonebook pictures/names, sms'es (text or pictures of the person sending them), radio stations (tag of music, picture), command buttons, and menu items.

In screenshot 3.2 the user has pressed the navigation key 10 on the right side, and the processor has started to move the information items 43 in the string along the path 45 in the direction of the arrow (pressing the left side of the navigation key 10 will result in a movement in the opposite direction). When the string was not moving, the path 45 had a substantially rectangular shape. Now that the string of information items 43 is moving at a relatively low speed, the corners of the path 45 are no longer sharp, but have become rounded off to form curved sections of the path 45, so that the rectangle has become a rounded rectangle. Further, the shape of the information items has changed from a rectangle to a parallelogram to indicate to the user that a certain amount of speed is associated with these information items 43.

The processor 18 increases the speed of the movement of the string of information items for as long as the user keeps pressing the navigation key 10. According to an embodiment the processor limits the maximum speed of movement of the string information items, so after a while there will be no further increase in speed when the user keeps on pressing the navigation key 10.

In screenshot 3.3 the user has pressed the navigation key 10 on the right side for a longer period of time, and the string of information items moves at a higher speed. This is indicated to the user by the fact that the path 45 has become more curved and the path 45 now includes only curved sections with the overall shape of the path resembling an ellipse. Further, the parallelogram shape of the information items has been further changed with more slanting sides.

When the speed of the string of information items reduces, the information items 43 and the path 45 reassume (gradually or stepwise) the shape that they had at low or no speed.

The embodiment of FIG. 3 equally applies to strings of information items with another nature, such as menu items in a menu application, virtual command buttons and other graphical user interface objects.

Figure 4:
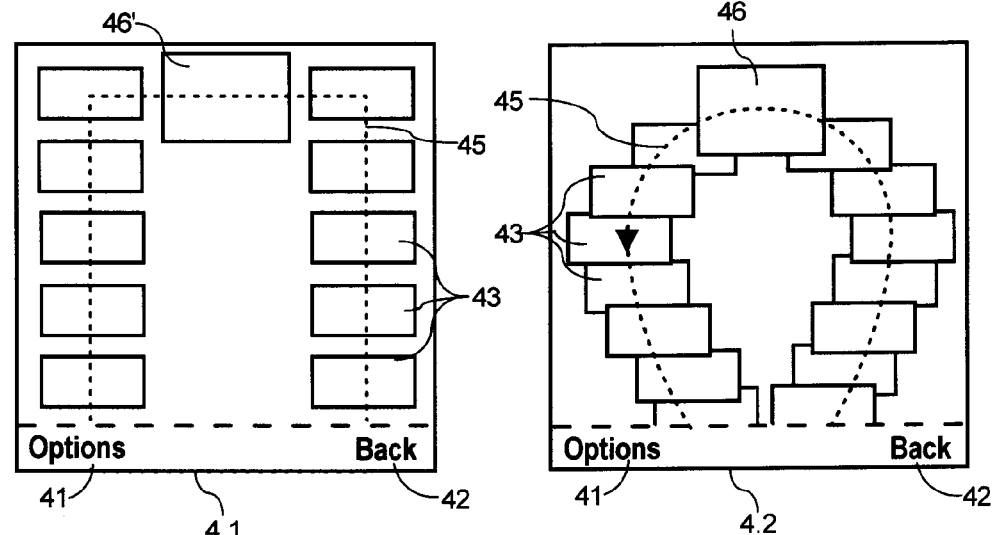
FIG. 4 shows two screenshots illustrating another embodiment of a method of operating the user interface according to the invention.

FIG. 4 illustrates another embodiment by two screenshots of a gallery application in which thumbnails of pictures stored in the memory of the mobile phone 1 are displayed as a string of information items 43 on the display screen 3. The left softkey label 41 and the right softkey label 42 are displayed on the lower part of the display screen 3, and allow the user to access an options related menu via the left softkey 9 and to leave the gallery application via the right softkey 9.

In screenshot 4.1 the string of information items 43 is not moving and the information items 43 are arranged in the string in accordance with a substantially rectangular path 45. When the user presses the navigation key 10 on the left or on the right side, the processor 18 will start moving the string of information items along a path 45. The path 45 does not fit within the display screen 3, and thus, when the string of information items is moving, new information items 43 are added to the string at one end and removed from the string at the other end to create an endless loop of information items.

One of the information items 43 is highlighted by having an enlarged size 46', and the highlighted information item can be selected by centrally pressing the navigation key 10.

In screenshot 4.2 the user has pressed the navigation key 10 on the right side for a longer period of time and the processor 18 moves the information items 43 in the string along the path 45 in the direction of the arrow at a relatively high speed. The processor 18 has adapted the shape of the path 45 to the high speed, so that the path 45 has become curved and resembles a horseshoe. Further, the processor 18 has reduced the distance between neighboring information items, and neighboring information items partially overlap one another. The change in the shape of the path and the change in the distance between the neighboring information items can be can be gradual with increasing or decreasing speed of movement of the string of information items or stepwise with increasing and decreasing speed of the string of information items. Also in this embodiment the speed of movement is controlled by the length of continuously pressing the navigation key 10.

Figure 5:
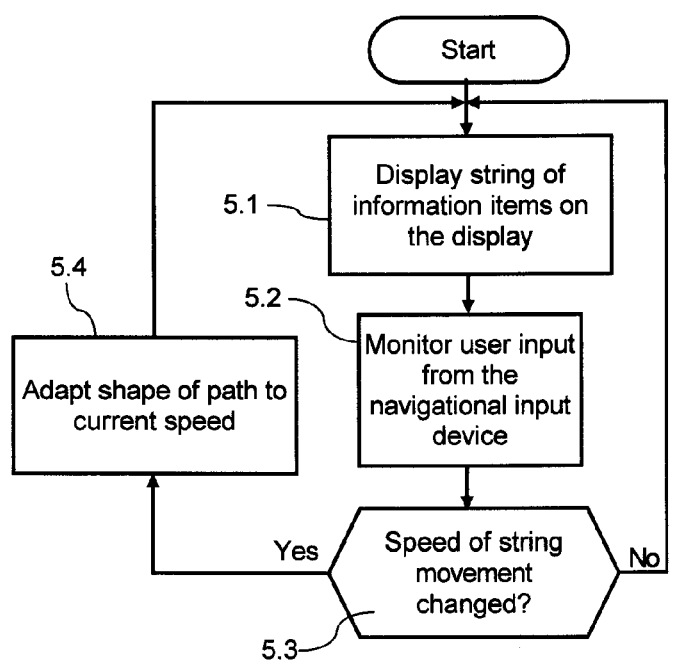
FIG. 5 is a flowchart illustrating the operation of the user interface according to an embodiment of the invention.

The method of operation of the user interface according to one embodiment is further illustrated by the flowchart of FIG. 5. In step 5.1 the processor 18 displays the string of information items 43 on the display screen 3. The string of information items is initially displayed statically on a predetermined path 45. In step 5.2 the processor monitors the user input from the navigational input device 10. The processor 18 controls the speed of the movement of the string of information items along the predetermined path 45 in response to user input from the navigational input device 10. In step 5.3 the processor determines if the speed of movement of the string of information items has changed. If the speed has not changed, the process returns to step 5.1 and the string of information item follows the same path 45 at the same speed. If the speed has changed, the processor 18 adapts the shape of the path 45 to the current speed in step 5.4. This change may be gradual or stepwise in accordance with one or more predetermined speed thresholds. A large plurality of different shapes for the path can be preprogrammed and associated to various levels of speed.

According to an embodiment, the color of the information items can be changed in relation to the speed of movement of the string of information items along the path.

According to another embodiment, the size of the information items can be changed in relation to the speed of movement of the string of information items along the path.

According to another embodiment (not shown) the navigational input device for controlling the speed of the sting of information items can be a scrollbar, such as a touch sensitive scroll bar, a touch pad, a rotator, a scroll wheel, a touch wheel or a joystick.

The invention has numerous advantages. Different embodiments or implementations may yield one or more of the following advantages. It should be noted that this is not an exhaustive list and there may be other advantages which are not described herein. One advantage of the invention is that a user will easily recognize at which speed the string of information items is moving. Another advantage is that the way of displaying information items is intuitive, since most things in real world react differently with speed. Another advantage is that a rectangular path is visually good when there is no movement, using the maximum available space on of the small device screen, but for fast movement it is visually better to use a curved path shape, since it is easier to see items in fast movement when they move smoothly along a curved shape. However, when navigating slowly, it is more effective to use the whole available space of the display screen. Further, the user interface according to the disclosed embodiments feels more "alive" and realistic, which gives sophisticated feedback for user actions, thus making use of the device easier. Trust to the device is increased due to improved intuitive feedback. Another advantage is that the user receives additional information about navigation activities.

The term "comprising" as used in the claims does not exclude other elements or steps. The term "a" or "an" as used in the claims does not exclude a plurality. The single processor or other unit may fulfill the functions of several means recited in the claims.

Although the disclosed embodiments have been described in detail for purpose of illustration, it is understood that such detail is solely for that purpose, and variations can be made therein by those skilled in the art without departing from the scope of the invention.

The invention claimed is:

1. An apparatus with a graphical user interface, said apparatus comprising:
   a processor;
   a display screen coupled to said processor;
   a navigational input device coupled to said processor;
   wherein the processor is configured to:
      display a plurality of information items on the display screen;
      position the information items on the display screen as a string of information items along a path;
      move the string of information items along said path in response to input from said navigational input device; and
      change a shape of said path in relation to a speed at which the string of information items moves along the path by including only straight sections at zero speed of movement of the string of information items and including one or more curves at increased speeds of movement of the string of information items.

2. An apparatus according to claim 1, wherein said display screen has a substantially rectangular outline.

3. An apparatus according to claim 2, wherein the path becomes increasingly curved with increasing speed of movement of said string and vice versa.

4. An apparatus according to claim 1, wherein the path is U-shaped or rectangular at zero speed of movement of the string of information items, and wherein the path gradually or stepwise becomes substantially elliptic with increasing speed of movement of the string of information items and vice versa.

5. An apparatus according to claim 1, wherein said processor is configured to equally space the information items in said string along said path at a distance that is varied in relation to the speed at which the string moves.

6. An apparatus according to claim 5, wherein the distance between neighboring information items is decreased with increasing speed of movement of said string of information items and vice versa.

7. An apparatus according to claim 6, wherein said neighboring information items do not overlap one another at zero speed of movement of said string of information items, and wherein said neighboring information items overlap one another at increased speeds of movement of said string of information items.

8. An apparatus according to claim 1, wherein at least one of the shape of the outline or the size or the color of at least one of the information items in said string of information items changes in relation to the speed of movement of said string of information items.

9. An apparatus according to claim 1, wherein said path is a closed path that fits within the boundaries of the display screen, so that all information items in said string are displayed simultaneously on said display screen.

10. An apparatus according to claim 1, wherein said path is a closed path that does not fit within the boundaries of said display screen, and wherein only a portion of the information items in said string of information items is displayed at any given point of time on said display screen.

11. An apparatus according to claim 1, wherein said information items are icons in a menu application or thumbnails of pictures in a gallery application.

12. An apparatus according to claim 1, wherein one of said information items is highlighted for selection.

13. An apparatus according to claim 12, wherein the highlighted information item is displayed larger than the other information items in the string.

14. An apparatus according to claim 1, wherein the information items are selectable items.

15. An apparatus according to claim 1, wherein the information items are objects of the graphical user interface.

16. An apparatus according to claim 1, wherein the information items are menu items or virtual command buttons.

17. An apparatus according to claim 1, wherein the navigational device is a navigation key, a navigation plus select key, a scrollbar, a touchpad, a scroll wheel, a rotator, a joystick or a touch sensitive scroll ring.

18. A method for operating a graphical user interface of an apparatus that is provided with a display screen and a navigational input device, said method comprising:
   displaying a string of information items on the display screen along a path;
   moving said string of information items along said path in response to input from said navigational input device; and
   changing a shape of said path in relation to a speed at which the string of information items moves along the path by including only straight sections at zero speed of movement of the string of information items and including one or more curves at increased speeds of movement of the string of information items.

19. A method according to claim 18, wherein said path assumes an increasingly curved shape with increasing speed of said string of information items, and wherein said path assumes an increasingly straight shape with decreasing speed of said string of information items.

20. A method according to claim 18, wherein the speed of movement of said string of information items is controlled by the navigational input device.

21. A method according to claim 18, wherein a contour or shape of the information items is changed in relation to the speed of the movement of said string of information items.

22. A method according to claim 18, wherein a distance between neighboring information items in the string of information items is changed in relation to the speed of movement of the string of information items.

23. A software product embodied in a computer readable storage medium for use in an apparatus that is provided with a processor, a display screen and a navigational input device, said software code configured to cause said processor to:
   display a string of information items on the display screen along a path,
   move said string of information items along said path in response to input from said navigational input device, and
   change a shape of said path in relation to a speed at which the string of information items moves along the path by including only straight sections at zero speed of movement of the string of information items and including one or more curves at increased speeds of movement of the string of information items.

24. An apparatus comprising:
   means for displaying a string of information items on a display screen of the apparatus along a path,
   means for moving said string of information items along said path in response to input from a navigational input device of the apparatus, and
   means for changing a shape of said path in relation to a speed at which the string of information items moves along the path by including only straight sections at zero speed of movement of the string of information items and including one or more curves at increased speeds of movement of the string of information items.

* * * * *